(No Model.)
E. W. HARDEN.
VALVE SETTING LEVER.
No. 529,264. Patented Nov. 13, 1894.
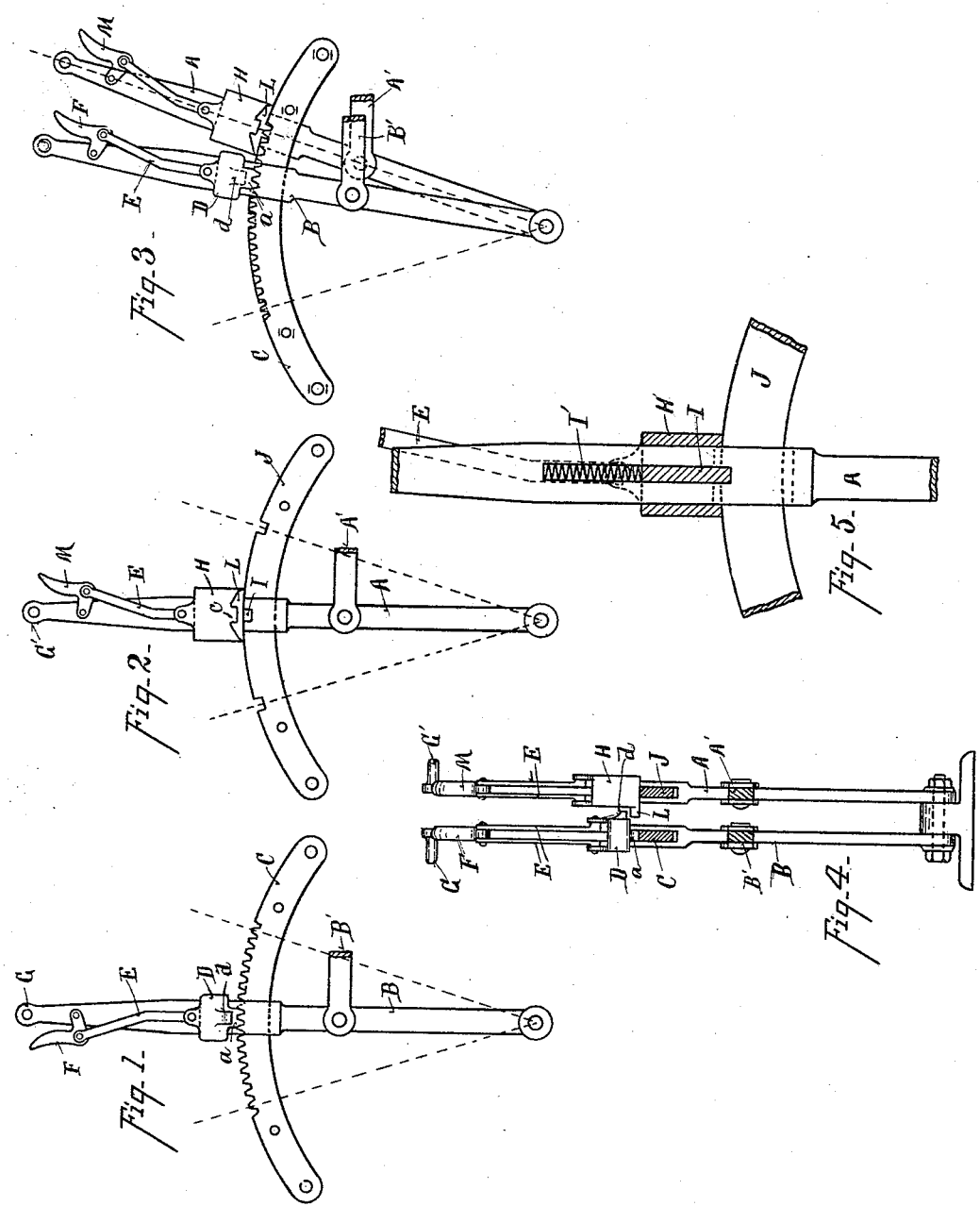
Attest
C. W. Miles
Oliver B. Kaiser
Inventor
E. W. Harden
By Wood & Boyd atty
THE NORRIS PETERS CO., PHOTO-LITHO., WASHINGTON, D. C.

UNITED STATES PATENT OFFICE.

EDWARD W. HARDEN, OF CINCINNATI, OHIO, ASSIGNOR TO F. C. WEIR, OF SAME PLACE.

VALVE-SETTING LEVER.

SPECIFICATION forming part of Letters Patent No. 529,264, dated November 13, 1894.

Application filed March 20, 1894. Serial No. 504,451. (No model.)

*To all whom it may concern:*

Be it known that I, EDWARD W. HARDEN, residing at Cincinnati, in the county of Hamilton and State of Ohio, have invented certain new and useful Improvements in Valve-Setting Levers, of which the following is a specification.

My invention relates to levers for controlling the main and cut-off valves of a locomotive.

One of the objects of my invention is to so combine the two levers that the operation of the main valve will operate under the same conditions the cut-off valve lever, while the cut-off valve lever can be operated independent of the main valve lever.

The features of my invention will be fully set forth in the description of the accompanying drawings forming a part of this specification, in which—

Figure 1, is a side elevation of the cut-off valve lever and segment. Fig. 2, is a side elevation of the main valve lever and its locking segment. Fig. 3, is a side elevation of the main and cut-off valve levers in position for use. Fig. 4, is a rear elevation of Fig. 3. Fig. 5, is a central vertical section of Fig. 2.

A, represents the operating and reversing lever for the main valve.

B, represents the operating and reversing lever for the cut-off valve.

A', represents the connecting rod pivoted to lever A, the forward end of course being hinged to the valve stem.

B', represents the connecting rod for the cut-off valve.

C, represents the notch segment for locking the cut-off valve lever in any desired position.

D, represents a sleeve provided with one or more teeth a, engaging with the notches of segment C.

E, represents a connecting rod hinged to the sleeve D, at one end and to the bell crank lever F, at the opposite end. Bell crank lever F, is pivoted near the handle G, of the lever B, in the usual form for operating the block.

Lever A, is provided with the sleeve H, sliding thereon. I, represents a lock pin passing through said sleeve and engaging with the notches in the segment J.

I', represents the usual spring coiled around the locking pin for holding it normally in engagement with the notch of the segment. The sleeve D, is of course provided with a similar spring to hold the teeth a, in engagement with the notches of the segment C. Upon the side of the sleeve H, is a double incline L, provided with a notch c. Upon the sleeve D, is a lug d, projecting outward and moving in the same vertical plane as the incline L.

Mode of operation: When the locomotive is running the main valve is approximately wide open, and when going forward is in the position shown in Fig. 3. The cut-off valve lever is adjusted to the desired position forward of the central notch for part of the stroke cut-off. If it is desired to reverse and run backward, the reversal can be made by the operation of only one lever. The operator releases the lock pin I, by operating the crank lever M, and lever A, may be pulled by the operator backward. As the incline L, comes opposite the sleeve D, the lug d, engages with and rides up the incline L, releasing the lock teeth a, from engagement with the segment. Said lug will drop into the notch c, and the lever B, will move backward in unison with the lever A, until the sleeve H, is dropped, when the lever B, will also lock in position. Thus the operation of lever A, will carry the lever B, back into the central position shown in Fig. 2, or to the rear position shown by the dotted lines g. Of course the reverse movement of the levers will be accomplished in the same manner; the incline L, will pick up lug d, release the lock of lever B, and cause it to move forward with the lever A. It will be seen that the lever B, can be moved independently of the lever A, to any desired position so as to regulate the cut-off valve, but whenever the lever A, is moved past the position of the lever B, either forward or backward, it will carry the lever B, with it.

I do not wish to confine myself to the particular form of releasing and picking up device which consists of the incline L, and the lug d, as other similar means may be provided whereby the movement of lever A, past the position of lever B, will unlock said lever and carry it with it, but the form here shown is simple and effective.

I claim—

1. The combination, with a segment, of the levers A, B, adapted to operate the main and cut-off valves of an engine and provided with locking mechanisms, one of said locking mechanisms having a device to release the other locking mechanism, substantially as specified.

2. The combination, with the segment C, of the levers A, B, adapted to operate the main and cut-off valves of an engine, and locking devices attached to said levers and provided with engaging parts constructed so that the movement of one lever will automatically engage with and release the locking devices and carry the other lever, substantially as specified.

In testimony whereof I have hereunto set my hand.

EDWARD W. HARDEN.

Witnesses:
ISAAC BOGART,
W. R. WOOD.